United States Patent [19]

Hibi et al.

[11] Patent Number: 5,259,598
[45] Date of Patent: Nov. 9, 1993

[54] FLUID-FILLED ELASTIC MOUNT HAVING DYNAMIC DAMPER FOR MOUNTING BRACKET, UTILIZING EQUILIBRIUM DIAPHRAGM COVER

[75] Inventors: Masayuki Hibi, Komaki; Yoshiki Funahashi, Iwakura, both of Japan

[73] Assignee: Tokai Rubber Industries, Ltd., Japan

[21] Appl. No.: 863,868

[22] Filed: Apr. 6, 1992

[30] Foreign Application Priority Data

Apr. 11, 1991 [JP] Japan .................. 3-32826[U]

[51] Int. Cl.$^5$ .............................................. F16F 13/00
[52] U.S. Cl. ...................... 267/140.13; 267/219
[58] Field of Search .............. 267/140.13, 219, 220, 267/140.11, 140.14, 140.12; 180/300, 312, 902; 248/559, 562, 636, 638

[56] References Cited

U.S. PATENT DOCUMENTS

| | | | |
|---|---|---|---|
| 4,418,897 | 12/1983 | Hartel . | |
| 4,817,925 | 4/1989 | Sprang et al. . | |
| 4,834,348 | 5/1989 | Jordens et al. | 267/140.13 |
| 5,009,404 | 4/1991 | Hirazawa | 267/140.13 |
| 5,018,699 | 5/1991 | Bretaudeau et al. | 267/140.13 X |

FOREIGN PATENT DOCUMENTS

| | | |
|---|---|---|
| 0044545 | 1/1982 | European Pat. Off. . |
| 0258851 | 3/1988 | European Pat. Off. . |
| 57-9340 | 1/1982 | Japan . |

Primary Examiner—Douglas C. Butler
Attorney, Agent, or Firm—Parkhurst, Wendel & Rossi

[57] ABSTRACT

A fluid-filled elastic mount including an elastic body for elastically connecting a first and a second support member, a partition structure cooperating the elastic body and a flexible diaphragm to partially define a pressure-receiving chamber and a variable-volume equilibrium chamber, respectively, which communicate with each other through an orifice, and a protective member fixed to the second support member for covering the diaphragm. The elastic mount has an elastic support member through which the protective member is elastically attached to the second support member and which cooperates with the protective member to provide a dynamic damper wherein the elastic support member is a spring member while said protective member is a mass member. This dynamic damper is effective to minimize resonating phenomenon of a mounting bracket used for fixing the second support member to one of two members that are flexibly connected by the elastic mount.

11 Claims, 3 Drawing Sheets

FLUID-FILLED ELASTIC MOUNT HAVING DYNAMIC DAMPER FOR MOUNTING BRACKET, UTILIZING EQUILIBRIUM DIAPHRAGM COVER

BACKGROUND OF THE INVENTION

1. Field of the Invention

The present invention relates generally to a fluid-filled elastic mount, and more particularly to improved construction of such a fluid-filled elastic mount adapted to prevent or minimize vibrations or booming noises due to resonance of a mounting bracket or a similar member for mounting the elastic mount.

2. Discussion of the Prior Art

An elastic mount is known as a vibration damping device interposed between two members of a vibration system, for flexibly connecting these two members. As one type of such elastic mount, there is known a so-called fluid-filled elastic mount as disclosed in laid-open Publication No. 57-9340 of unexamined Japanese Patent Application, which includes a first and a second rigid support member that are radially spaced apart from each other by a suitable distance, an elastic body interposed between these first and second support members to elastically connect the two support members, and a partition structure which is supported by the second support member and which partially defines a pressure-receiving chamber and an equilibrium chamber on the opposite sides thereof. These chambers are filled with a non-compressible fluid. The pressure-receiving chamber is partially defined by the elastic body, so that the pressure of the fluid in the pressure-receiving chamber changes due to elastic deformation of said elastic body, upon application of a vibrational load to the elastic mount. The equilibrium chamber is partially defined by a flexible diaphragm, so that the volume of the equilibrium chamber is easily variable. The pressure-receiving and equilibrium chambers communicate with each other through an orifice passage, so that the fluid is permitted to flow through the orifice passage between the two chambers when the pressure in the pressure-receiving chamber changes. In this type of fluid-filled elastic mount, a cap member is attached to the second support member by calking or other suitable means, for protecting the flexible diaphragm.

The fluid-filled elastic mount constructed as described above is capable of providing an excellent vibration damping or isolating effect which cannot be obtained by the elasticity of an elastic body alone, based on resonance of the fluid flowing through the orifice passage. Thus, the fluid-filled elastic mount of this type has been suitably used as an engine mount for a motor vehicle, for example.

Such a fluid-filled elastic mount is installed between two members to be flexibly connected, such that the first rigid support member is fixed to one of these two members while the second rigid support member is fixed to the other of the two members. Depending upon the construction or configuration of the two members to be flexibly connected by the elastic mount, a suitable mounting bracket is attached to the second support member, so that the second support member is fixed to the appropriate member through the mounting bracket.

The mounting bracket is usually formed from a steel plate by pressing, and tends to resonate at the frequency of the vibration received by the elastic mount, causing booming noises. Further, the resonating mounting bracket results in amplifying the received vibration, whereby the damping function of the elastic mount may be deteriorated or adversely influenced.

One possible solution to the problem indicated above is to attach a dynamic damper directly to the mounting bracket. Where the elastic mount is used as the engine mount for motor vehicles, however, it is difficult in most cases to provide the mounting bracket with an effective damping mechanism, because of a limited installation space allocated to the engine mount. Moreover, the provision of such a damping mechanism for the mounting bracket requires additional parts or components, vulcanization process and assembling steps other than those for the elastic mount per se, whereby the cost of manufacture of the elastic mount assembly including the mounting bracket and dynamic damper is inevitably increased. Therefore, the solution is not found effective to deal with the problem with the mounting bracket.

SUMMARY OF THE INVENTION

The present invention was developed in the light of the prior art situations described above. It is therefore an object of this invention to provide an improved fluid-filled elastic mount which has effective means for minimizing or preventing vibrations or booming noises due to resonance of the mounting bracket, without an increase in the required installation space or without requiring a part or parts exclusively designed for the mounting bracket.

The above object may be attained according to the principle of the present invention, which provides a fluid-filled elastic mount including a first and a second support member which are spaced apart in a radial direction of the elastic mount, an elastic body interposed between and elastically connecting the first and second support members, a partition structure disposed in and supported by the second support member, a flexible diaphragm fixed to the second support member, and a protective member fixed to the second support member for covering the diaphragm, the partition structure cooperating with the elastic body and the flexible diaphragm to partially define a pressure-receiving chamber and an equilibrium chamber, respectively, on opposite sides thereof, the pressure-receiving and equilibrium chambers being filled with a non-compressible fluid and communicating with each other through an orifice passage, the elastic body permitting a pressure of the fluid in the pressure-receiving chamber to change due to elastic deformation thereof upon application of a vibrational load to the elastic mount, the flexible diaphragm permitting a volumetric change of the equilibrium chamber due to elastic deformation thereof, wherein the improvement comprises an elastic support member through which the protective member is elastically attached to the second support member and which cooperates with the protective member to provide a dynamic damper in which the elastic support member is a spring member while the protective member is a mass member.

A technical concept underlying the present invention lies in the utilization of the protective member for the flexible diaphragm, to provide the elastic mount with the dynamic damper as described above. This concept was based on a finding of the present inventors that the protective member need not be directly fixed to the second support member, for serving its function of protecting the flexible diaphragm, and that there are no considerable restrictions or limitations in designing the protective member in terms of its strength value, configuration, mass and other specifications, in order for the protective member to serve its originally assigned function. That is, the inventors discovered that the protective member used in the known fluid-filled elastic mount could be modified to also serve as the mass member of the dynamic damper.

In the fluid-filled elastic mount constructed as described above according to the principle of the present invention, the dynamic damper consisting of the protective member and the elastic support member is capable of positively minimizing vibrations of a mounting bracket attached to the second support member for fixing the elastic mount to one of two members that are flexibly connected by the instant elastic mount. Accordingly, the dynamic damper is effective to reduce or prevent resonance of the mounting bracket and the resulting vibration or booming noises of the elastic mount, whereby the damping characteristics of the instant elastic mount is significantly improved.

Further, the protective member which is a part of the elastic mount is utilized as the mass member of the dynamic damper for minimizing the resonance of the mounting bracket. Hence, the dynamic damper required neither an increase in the installation space for the elastic mount assembly, nor any parts exclusively designed for damping the vibration of the mounting bracket. Thus, the present elastic mount is simple in construction and economical to manufacture. These are significant technical aspects and advantages of the present invention.

BRIEF DESCRIPTION OF DRAWINGS

The above and optional objects, features and advantages of the present invention will be better understood by reading the following detailed description of a presently preferred embodiment of the invention, when considered in conjunction with the accompanying drawings, in which.

DETAILED DESCRIPTION OF THE PREFERRED EMBODIMENT

Figure 1:
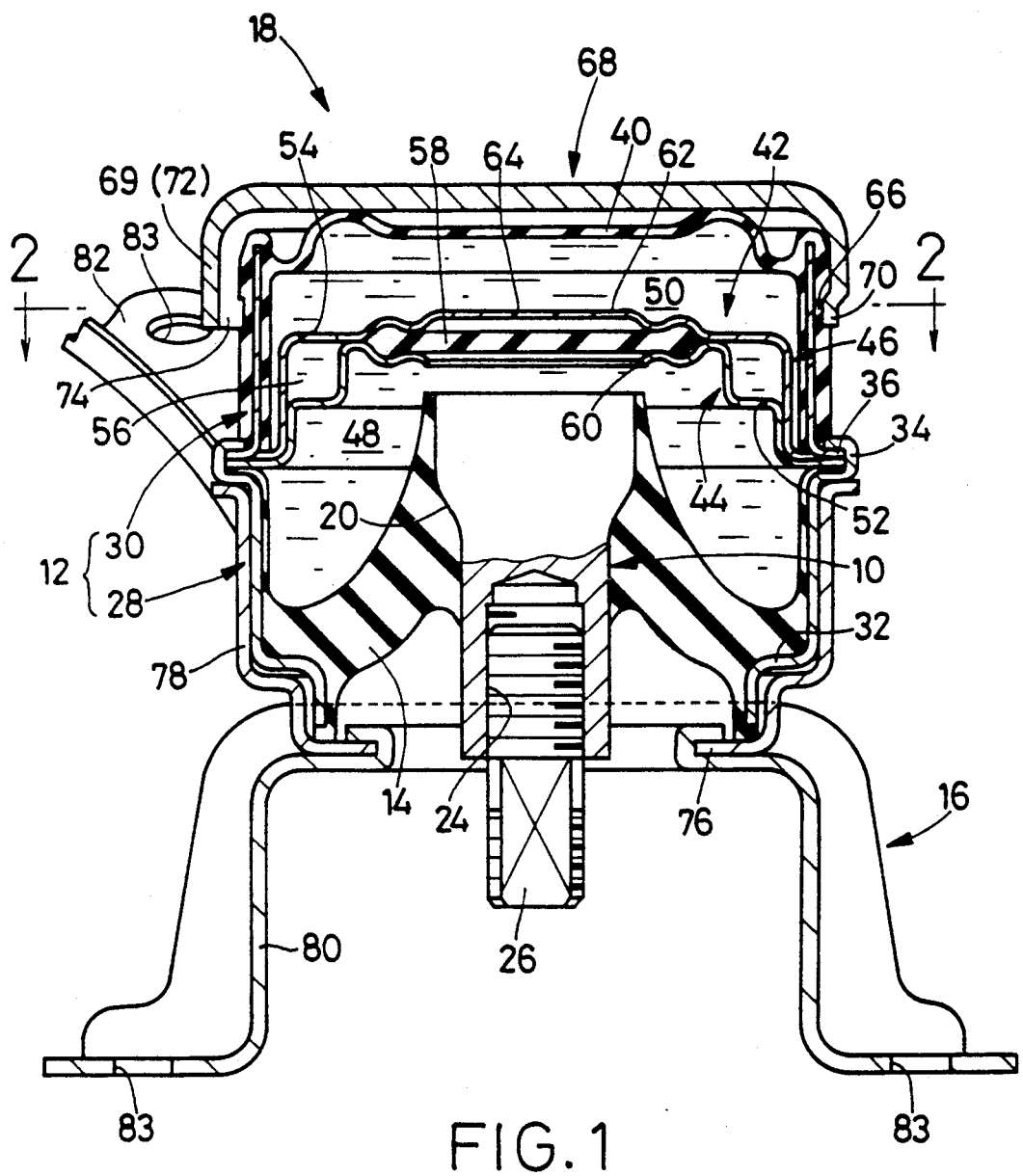
FIG. 1 is an elevational view in cross section of a fluid-filled elastic mount in the form of a vehicle engine mount embodying the present invention, taken along line 1—1 of FIG. 2.
Figure 2:
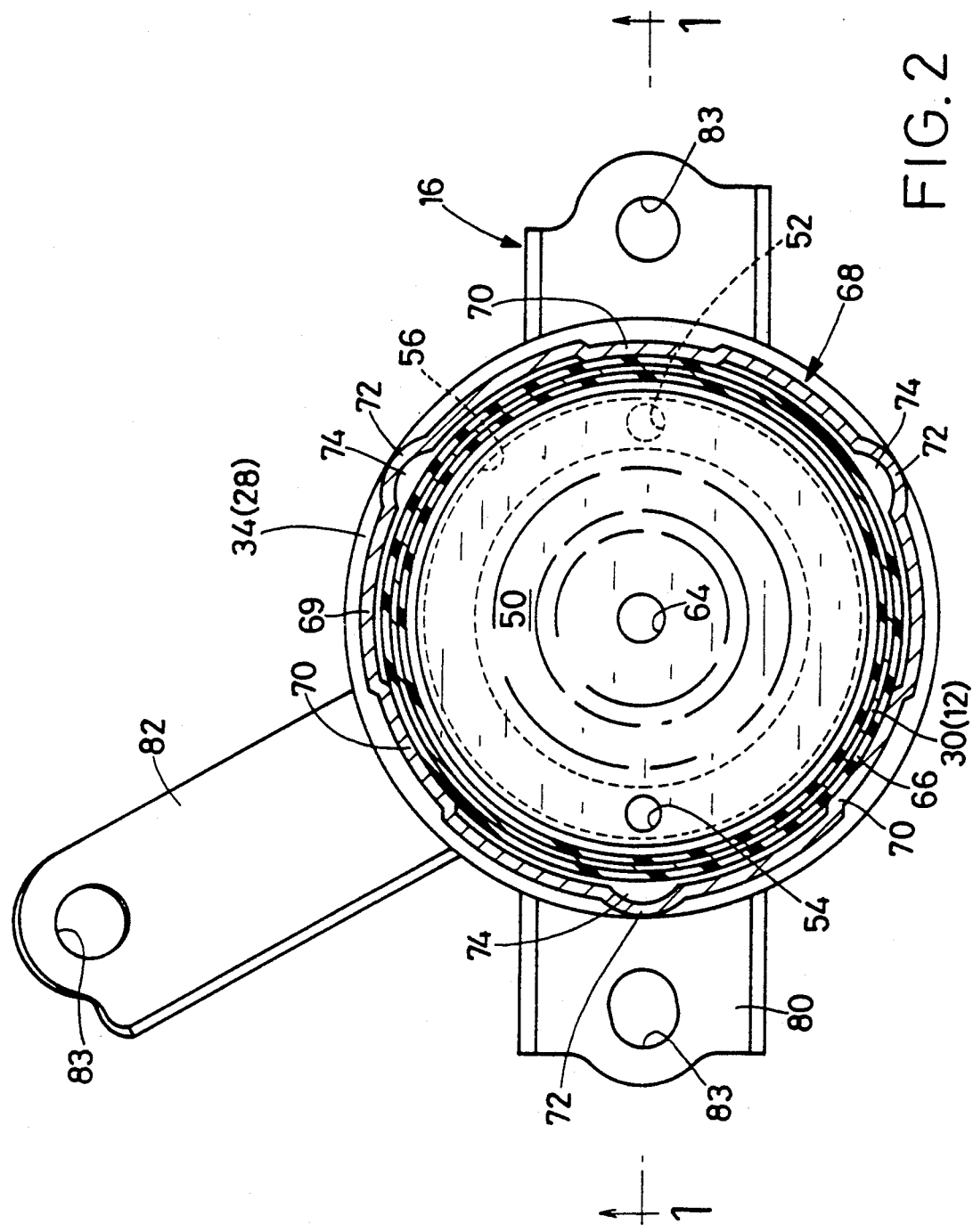
FIG. 2 is a cross sectional view taken along line 2—2 of FIG. 1.
Figure 3:
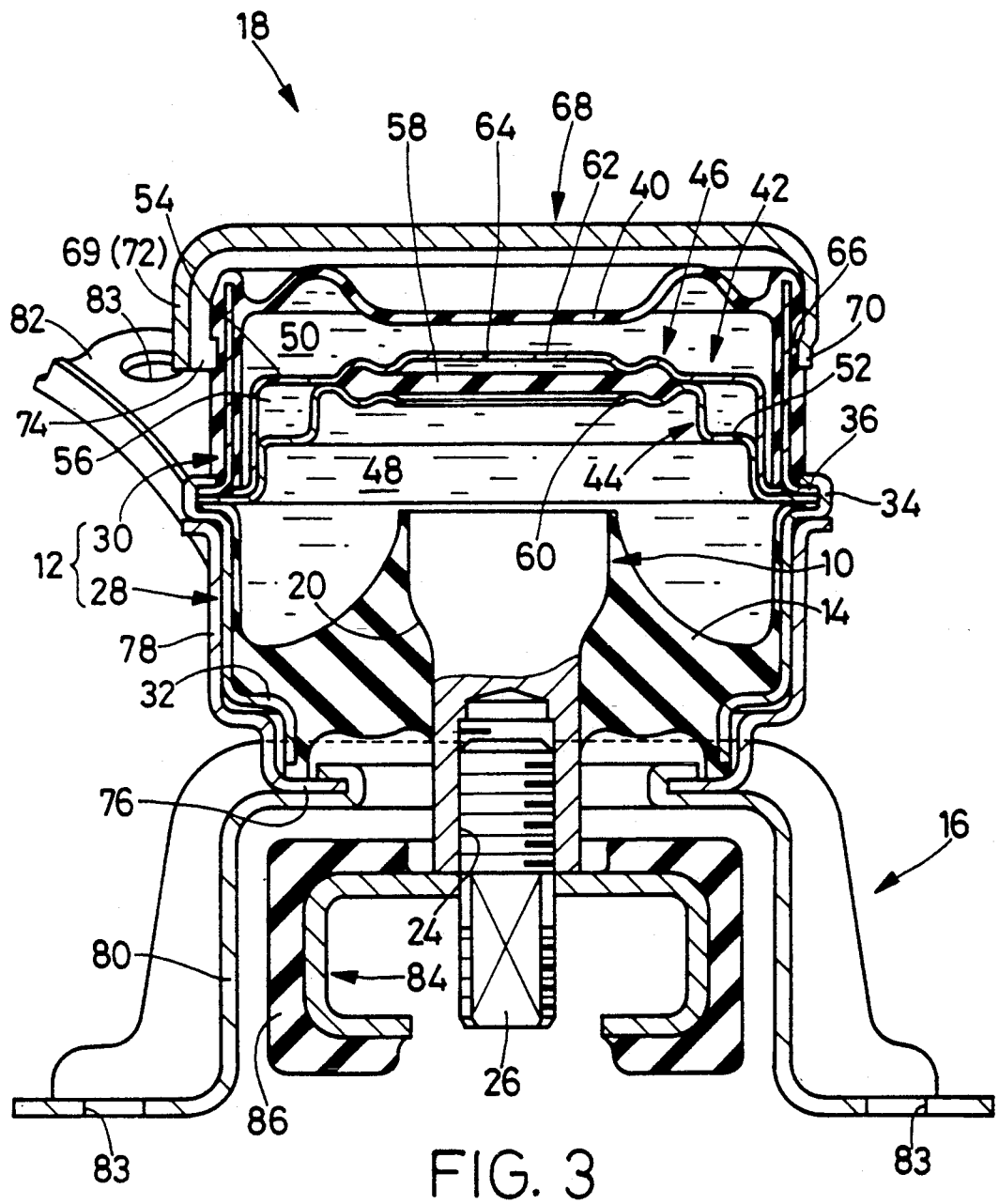
FIG. 3 is an elevational view in cross section of the fluid-filled mount of FIG. 1 as installed on a motor vehicle.

Referring to FIGS. 1, 2 and 3 showing a vehicle engine mount 18 constructed according to one embodiment of the fluid-filled elastic mount of the present invention, reference numerals 10 and 12 denote a first and a second rigid support member, respectively. These first and second support members 10, 12 are spaced apart from each other in a radial direction of the engine mount 18, and are elastically connected to each other by an elastic body 14 interposed therebetween.

A mounting bracket 16 is fixed to a lower end of the second support member 12, so that the second support member 12 is fixed to the body of a motor vehicle through the mounting bracket 16. On the other hand, the first support member 10 is fixed, directly or via a suitable bracket, to the engine unit of the vehicle. Thus, the engine mount 18 is installed on the vehicle, as shown in FIG. 3, for flexibly connecting the engine unit to the vehicle body, such that the engine unit is suspended through the engine mount 18. When the engine mount 18 as shown in FIGS. 1 and 2 is installed on the vehicle, the elastic body 14 is compressed with the weight of the engine unit acting on the first support member 10. As a result, the first and second support members 10, 12 are moved in an axial direction of the engine mount 18 away from each other, as shown in FIG. 3. The engine mount 18 is oriented so that vibrations are primarily received by the engine mount 18 in its axial direction. This axial direction will be referred to as "load-receiving direction", where appropriate.

Described in more detail, the first support member 10 is a solid rod having an axially intermediate tapered portion 20, and a small-diameter and a large-diameter end on the axially opposite sides of the tapered portion 20. The end portion having the small-diameter end has an internally threaded hole 24 in which a mounting bolt 26 is partially screwed. The mounting bolt 26 has an exposed axial portion chamferred at its end face outside the hole 24, so that the exposed axial portion is used to fix the first support member 10 to the engine unit.

The second support member 12 consists of a first and a second cylindrical member 28, 30, which are fixed together by calking at their appropriate ends. The first cylindrical member 28 is a thin-walled cylindrical member with a relatively large diameter, which has an axially intermediate stepped portion 32, so that the member 28 has a small-diameter and a large-diameter portion on the axially opposite sides of the stepped portion 32. The large-diameter portion has a calked end as indicated at 34. The second cylindrical member 30 is also a thin-walled cylindrical member with a relatively large diameter, which has an outward flange 36 at one end corresponding to the end of the first cylindrical member 28 which has the calked portion 34. The first and second cylindrical members 28, 30 are fluid-tightly fixed together at their corresponding ends, by the calked portion 34 which is pressed against the outward flange 36, such that the two members 28, 30 are coaxial with each other. Thus, the second support member 12 assumes a substantially cylindrical shape.

As shown in FIG. 1, the first and second support members 10, 12 are substantially coaxially positioned relative to each other, with the large-diameter end of the first support member 10 positioned within the second support member 12 over a suitable axial length, and with a suitable radial spacing with respect to the second support member 12.

The elastic body 14 is interposed between the first support member 10 and the first cylindrical member 28 of the second support member 12, and has a generally truncated conical shape. The elastic body 14 is bonded to the first support member 10 and the first cylindrical member 28, by means of vulcanization of a rubber material, such that the small-diameter portion of the elastic body 14 is secured to the outer circumferential surface of a part of the first support member 10 which includes the tapered portion 20, while the large-diameter portion of the elastic body 14 is secured to the inner circumferential surface of a part of the first cylindrical member 28 which has the stepped portion 32. Thus, the first support member 10 and the first cylindrical member 28 of the second support member 12 are elastically connected to each other by the interposed elastic body 14.

The axially outer open end of the second cylindrical member 30 of the second support member 12 is fluid-tightly closed by a flexible diaphragm 40, which is secured by vulcanization to the inner circumferential surface of the second cylindrical member 30. Thus, the axially opposite open ends of the second support member 12 are closed by the elastic body 14 and the diaphragm 40, respectively, so as to form an interior space filled with a suitable non-compressible fluid. For effective flows of the fluid through an orifice passage 56 (which will be described), water, alkylene glycol, polyalkylene glycol or silicone oil is suitably used as the non-compressible fluid.

Within the interior space defined by the second support member 12, elastic body 14 and diaphragm 40, there is disposed a generally disk-shaped partition structure 42, so as to extend in the radial direction of the engine mount 18. The partition structure 42 is fixedly supported by the second support member 12, with its outer periphery gripped by and between the calked portion 34 of the first cylindrical member 28 and the outward flange 36 of the second cylindrical member 30. The interior space of the second support member 12 is divided by the partition structure 42 into two parts on the axially opposite sides of the partition structure 40. Namely, the partition structure 42 cooperates with the second support member 12, elastic body 14 and diaphragm 40, to define a fluid-tight pressure-receiving chamber 48 on the side of the elastic body 14, and a fluid-tight equilibrium chamber 50 on the side of the diaphragm 40.

The pressure-receiving chamber 48 is partially defined by the elastic body 14 so that the pressure of the non-compressible fluid in the chamber 48 changes due to elastic deformation of the elastic body 14 upon application of a vibrational load to the engine mount 18 in the load-receiving direction (in the axial direction). On the other hand, the equilibrium chamber 50 is partially defined by the flexible diaphragm 40, so as to permit easy change of the volume of the chamber 50 owing to elastic deformation or displacement of the diaphragm 40.

The partition structure 42 separating the pressure-receiving and equilibrium chambers 48, 50 includes generally hat-shaped first and second partition members 44, 46 that are superposed on each other in the axial direction of the engine mount 18. These partition members 44, 46 may be fixed together, as needed, by spot welding or other fixing means. The two partition members 44, 46 cooperate to define an annular channel therebetween, which extends in the circumferential direction of the partition structure 42. This annular channel communicates with the pressure-receiving and equilibrium chamber 48, 50 through first and second through-holes 52, 54 formed through the first and second partition members 44, 46. Thus, the partition structure 42 provides an orifice passage 56 for permitting flows of the fluid between the two fluid chambers 48, 50.

When a vibrational load is applied to the engine mount 18, there arises a difference between the fluid pressures in the pressure-receiving and equilibrium chambers 48, 50, whereby the fluid is forced to flow through the orifice passage 56 between the two chambers 48, 50. As a result, the engine mount 18 exhibits a desired damping effect based on the resonance of the fluid flowing through the orifice 56 passage. In the present embodiment, the length and cross sectional area of the orifice passage 56 are turned so as to provide a high damping effect with respect to engine shake and bounce, and similar vibrations having a relatively low frequency and a relatively large amplitude.

The first and second partition members 44, 46 define therebetween a central, relatively thin, generally flat circular space, in which is disposed an elastic partition disk 58, such that the partition disk 58 is sandwiched at its outer peripheral portion by and between the first and second partition members 44, 46. The first partition member 44 has a round hole 60 coaxially aligned with the elastic partition disk 58, while the second partition member 46 a has central raised portion 62 which slightly protrudes toward the flexible diaphragm 40. This raised portion 62 has a central communication hole 64 aligned with the round hole 60. The central portions of the opposite major surfaces of the partition disk 58 are normally spaced apart by suitable distances from the corresponding central portions of the first and second partition members 44, 46, so that upon application of the vibrational load to the engine mount 18, the central portion of the disk 58 is allowed to elastically oscillate in the axial direction due to flows of the fluid through the holes 60, 64 between the thin flat space of the partition member 42 and the pressure-receiving and equilibrium chambers 48, 50, when the fluid pressures in the two chambers 48, 50 periodically change, and the resulting pressure difference acts on the opposite surfaces of the disk 56.

The elastic oscillation or periodic deflection of the elastic partition disk 58 functions to absorb or accommodate a pressure increase in the pressure-receiving chamber 48 when the engine mount 18 receives a vibrational load having a relatively high frequency and a relatively small amplitude. Consequently, the dynamic spring constant of the engine mount 18 is effectively reduced with respect to the high-frequency small-amplitude vibrations such as booming noises of the vehicle. In other words, the present engine mount 18 is capable of effectively damping the high-frequency small-amplitude vibrations owing to the provision of the elastic partition disk 58. It is noted that the elasticity of the partition disk 58 is limited so as to limit the maximum amount of elastic deflection or oscillation of the disk 58 when the engine mount 18 receives the low-frequency large-amplitude vibrations that should be damped by the fluid flows through the orifice passage 56. Accordingly, the oscillation of the partition disk 58 does not considerably reduce the amount of the fluid flows through the orifice passage 56 upon application of the low-frequency large-amplitude vibrations.

To protect the flexible diaphragm 40 which is bonded by vulcanization to the open end of the second cylindrical member 30, a protective member in the form of a rigid cap member 68 is attached to the second cylindrical member 30. More precisely, a cylindrical portion 69 of the cap member 68 is fixed to the outer circumferential surface of the open end portion of the member 30. This cap member 68 assumes an inverted cup shape so as to cover the open end portion of the second cylindrical member 30 as well as the diaphragm 40.

Between the inner circumferential surface of the cylindrical portion 69 of the cap member 68 and the outer circumferential surface of the corresponding end portion of the second cylindrical member 30, there is formed an elastic support member in the form of a rubber layer 66 having a suitable thickness. In the present embodiment, this rubber layer 66 is formed integrally with the diaphragm 40, during the vulcanization process. The cylindrical portion 69 of the cap member 68 is pressed against the second cylindrical member 30 through the rubber layer 66. In other words, the cap member 68 is elastically attached to the second cylindrical member 30 via the rubber layer 66.

Described more specifically, the cylindrical portion 96 of the cap member 68 has three inward depressions 70 formed so as to protrude in the radially inward direction, as most clearly shown in FIG. 2. The three inward depressions 70 are equally spaced part from each other in the circumferential direction of the cylindrical portion 69, and are held in pressing contact with the rubber layer 66, whereby the cylindrical portion 69 of the cap member 68 is elastically press-fitted on the corresponding end portion of the second cylindrical member 30. The cylindrical portion 69 of the cap member 68 also has three outward protrusions 72 which are disposed intermediate between the adjacent inward depressions 70, as also shown in FIG. 2. The outward protrusions 72 are spaced away from the second cylindrical portion 30 (rubber layer 66), and cooperate with the rubber layer 66 to define three communication channels 74 which extend in the axial direction of the cap member 68. These communication channels 74 serve to permit air flows between the external space (atmosphere) outside the engine mount 18, and the internal space formed between the cap member 68 and the diaphragm 40.

Thus, the cap member 68 and the rubber layer 66 constitute a vibration system wherein the rubber layer 66 is a spring member while the cap member 66 is a mass member to be damped by the spring member. This vibration system can effectively function as a secondary vibration system or dynamic damper with respect to the second cylindrical member 30, i.e., with respect to the second support member 12, if the spring and mass members are suitably tuned.

The present engine mount 18 constructed as described above is installed on the vehicle such that the first support member 10 is fixed to the engine unit while the second support member 12 is fixed to the vehicle body, through the mounting bracket 16 attached to the first cylindrical member 28, as described above.

The mounting bracket 16 consists of a cylindrical member 78 having an inward flange 76 at one of its opposite axial ends, a generally portal first mounting arm 80 fixed by calking at its upper end to the inward flange 76, and a generally planar second arm 82 welded to the outer circumferential surface of the cylindrical member 78. The mounting bracket 16 is secured, at its cylindrical member 78, to the outer circumferential surface of the first cylindrical member 28 of the second support member 12, and is fixed, at its first and second arms 80, 82, to the vehicle body, through bolts inserted through bolt holes 83 formed through the arms 80, 82. Thus, the second support member 12 is attached to the vehicle body through the mounting bracket 16. In FIG. 3, reference numeral 84 denotes a stop fixed to the first support member 10 such that the stop 84 is located inside the first arm 80. This stop is adapted to limit the amount of relative displacement of the first and second support members 10, 12 in the axial direction, by abutting contact with the mounting bracket 16. The stop 84 has a rubber buffer 86 having a suitable thickness, for reducing shocks upon abutting contact of the stop 84 with the bracket 16.

Since the mounting bracket 16 and the second support member 12 are fixed together, these bracket and support member 16, 12 can be structurally considered to be a unitary member having the same vibration mode. Therefore, the vibration system provided by the cap member 68 and the rubber layer 66 (through which the cap member 68 is fixed to the second support member 30) effectively functions as the secondary vibration system with respect to the above-indicated unitary structure 12, 16 which is considered as the primary vibration system.

In the present engine mount 18, the resonance frequency of the above-indicated secondary vibration system 68, 66 is tuned depending upon the resonance frequency of the mounting bracket 16, by suitably tuning the mass of the cap member 68 and the spring constant of the rubber layer 66, so that the secondary vibration system 68, 66 is effectively operable as a dynamic damper for the mounting bracket 16. Accordingly, the secondary vibration system or dynamic damper 68, 66 effectively functions to reduce or prevent vibrations or booming noises due to the resonance of the mounting bracket 16.

Since the dynamic damper 68, 66 for the mounting bracket 16 utilizes the cap member 68 for protecting the diaphragm 40, the provision of the dynamic damper does not result in an increase in the size of the engine mount 18. Accordingly, the dynamic damper 68, 66 for preventing the resonance of the mounting bracket 16 can be provided, without deteriorating the damping characteristics of the engine mount 18, even where the required space for the engine mount 18 is more or less limited.

Since the cap member 68 for protecting diaphragm 40 is used to constitute the mass member of the dynamic damper (secondary vibration system), the dynamic damper does not require a large-sized exclusive mass member as the mass member of the secondary vibration system, and does not adversely affect the process of manufacture or assembling procedure of the engine mount 18.

Further, the rubber layer 66 which functions as the spring member of the dynamic damper 68, 66 is formed integrally with the diaphragm 40, whereby the present engine mount 18 equipped with the dynamic damper 68, 66 can be manufactured with high efficiency.

While the present invention has been described above in detail in its presently preferred embodiment, for illustrative purpose only, it is to be understood that the present invention is not limited to the details of the illustrated embodiment.

For instance, the configuration of the cap member 68 which functions as the mass member of the dynamic damper is not limited to the details in the illustrated embodiment, but may be modified as needed, depending upon the frequency of the vibrations to be absorbed, and the specific construction of the second support member 12.

While the rubber layer 66 is used as the elastic support member or spring member of the dynamic damper, the configuration of the elastic support member may be suitably modified as needed, depending upon the frequency of the vibrations to be absorbed and the specific construction of the second support member 12. For example, the elastic support member (rubber layer 66) may be an elastic layer formed on the second support member 12, separately from the flexible diaphragm 40, or alternatively an elastic member which is formed on the cylindrical portion 69 of the cap member 68 and secured to the second support member 12 by suitable means.

The construction of the mounting bracket 16 attached to the second support member 12, and the manner of attachment of the bracket 16 to the member 12 are not limited to the details of the illustrated embodiment.

In the illustrated embodiment, the engine mount 18 is adapted to flexibly connect the engine unit to the vehicle body such that the engine unit is suspended by the vehicle body, with the engine mount positioned above the engine unit. However, the principle of the present invention is equally applicable to an engine mount adapted to flexibly mount the engine unit such that the engine unit rests on the vehicle body through the engine mount positioned below the engine mount. Further, the present invention is applicable to various mounting devices other than an engine mount for motor vehicles.

It is to be understood that the present invention may be embodied with various other changes, modifications and improvements, which may occur to those skilled in the art, without departing from the spirit and scope of the invention defined in the following claims.

What is claimed is:

1. A fluid-filled elastic mount for flexibly connecting two members, said elastic mount comprising:
   a first and a second support member at which said elastic mount is fixed to said two members for flexible connection of said two members by said elastic mount, said second support member being spaced from said first support member radially outwardly of the elastic mount;
   an elastic body interposed between and elastically connecting said first and second support members;
   a partition structure disposed in and supported by said second support member;
   a flexible diaphragm fixed to said second support member;
   said partition structure cooperating with said elastic body and said flexible diaphragm to partially define a pressure-receiving chamber and an equilibrium chamber, respectively, on opposite sides thereof, said pressure-receiving and equilibrium chambers being filled with a non-compressible fluid;
   means for defining an orifice passage through which said pressure-receiving and equilibrium chambers communicate with each other;
   said elastic body permitting a pressure of said fluid in said pressure-receiving chamber to change due to elastic deformation thereof upon application of a vibrational load to the elastic mount, and said flexible diaphragm permitting a volumetric change of said equilibrium chamber due to elastic deformation thereof;
   a protective member fixed to said second support member for covering said diaphragm; and
   an elastic support member through which said protective member is elastically attached to said second support member so that said protective member is movable relative to said second support member, said elastic support member and said second support member cooperating with each other to provide a dynamic damper wherein said elastic support member is a spring member while said protective member is a mass member.

2. A fluid-filled elastic mount according to claim 1, wherein said elastic support member is formed integrally with said flexible diaphragm.

3. A fluid-filled elastic mount according to claim 1, further comprising a mounting bracket fixed to said second support member for fixing said second support member to one of said two members said first support member being fixed to the other of said two members.

4. A fluid-filled elastic mount according to claim 3, wherein said one of said two members is a body of a motor vehicle while said other of said two members is an engine unit of the motor vehicle, said first and second support members and said mounting bracket being positioned such that said engine unit fixed to said first support member is suspended on said body of the motor vehicle through said elastic mount.

5. A fluid-filled elastic mount according to claim 3, further comprising a stop operable for abutting contact with said mounting bracket for limiting an amount of a relative displacement of said first and second support members in an axial direction of said elastic mount.

6. A fluid-filled elastic mount according to claim 5, wherein said stop is fixed to said first support member and said mounting bracket includes a generally portal arm secured to one of opposite axial ends of said second support member remote from said flexible diaphragm, said stop being disposed within said generally portal arm.

7. A fluid-filled elastic mount comprising:
   a first and a second support member which are spaced apart in a radial direction of the elastic mount, said second support member comprising a generally cylindrical member;
   an elastic body interposed between and elastically connecting said first and second support members;
   a partition structure disposed in and supported by said second support member;
   a flexible diaphragm fixed to said second support member and closing one of axially opposite ends of said generally cylindrical member of said second support member;
   said partition structure cooperating with said elastic body and said flexible diaphragm to partially define a pressure-receiving chamber and an equilibrium chamber, respectively, on opposite sides thereof, said pressure-receiving and equilibrium chambers being filled with a non-compressible fluid;
   means for defining an orifice passage through which said pressure-receiving and equilibrium chambers communicate with each other;
   said elastic body permitting a pressure of said fluid in said pressure-receiving chamber to change due to elastic deformation thereof upon application of a vibrational load to the elastic mount, and said flexible diaphragm permitting a volumetric change of said equilibrium chamber due to elastic deformation thereof;
   a generally cup-shaped protective cap member fixed to said second support member for covering said diaphragm, said protective cap member having a cylindrical portion; and
   an elastic support member through which said protective cap member is elastically attached to said second support member such that said cylindrical portion of said protective cap member is pressed against an outer circumferential surface of said generally cylindrical member of said second support member through said elastic support member, said elastic support member and said second support member cooperating with each other to provide a dynamic damper wherein said elastic support member is a spring member while said protective cap member is a mass member.

8. A fluid-filled elastic mount according to claim 7, wherein said elastic support member comprises a rubber layer formed on one of said outer circumferential surface of said second support member and an inner circumferential surface of said cylindrical portion of said cap member.

9. A fluid-filled elastic mount according to claim 7, wherein said cylindrical portion of said cap member has a plurality of inward depressions which are held in pressing contact with said elastic support member.

10. A fluid-filled elastic mount according to claim 9, wherein said cylindrical portion of said cap member further has a plurality of outward protrusions which cooperate with said elastic support member to define a plurality of communication channels for communication of an internal space between said cap member and said flexible diaphragm, and an external space outside said elastic mount.

11. A fluid-filled elastic mount according to claim 10, wherein each of said plurality of outward protrusions is positioned intermediate between adjacent ones of said plurality of inward depressions.

* * * * *